(12) United States Patent
Gulati et al.

(10) Patent No.: US 11,647,517 B2
(45) Date of Patent: May 9, 2023

(54) ADAPTIVE SENSING BASED ON NUMBER OF RETRANSMISSIONS

(71) Applicant: QUALCOMM Incorporated, San Diego, CA (US)

(72) Inventors: Kapil Gulati, Belle Mead, NJ (US); Sudhir Kumar Baghel, Hillsborough, NJ (US); Tien Viet Nguyen, Bridgewater, NJ (US); Gabi Sarkis, San Diego, CA (US); Sourjya Dutta, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/152,578

(22) Filed: Jan. 19, 2021

(65) Prior Publication Data

US 2021/0266951 A1    Aug. 26, 2021

Related U.S. Application Data

(60) Provisional application No. 62/980,860, filed on Feb. 24, 2020.

(51) Int. Cl.
*H04W 72/10* (2009.01)
*H04W 72/23* (2023.01)
*H04B 17/318* (2015.01)
*H04W 92/18* (2009.01)

(52) U.S. Cl.
CPC .......... *H04W 72/23* (2023.01); *H04B 17/318* (2015.01); *H04W 92/18* (2013.01)

(58) Field of Classification Search
CPC .. H04B 17/318; H04B 17/327; H04B 17/382; H04W 72/14; H04W 92/18; H04W 72/02; H04L 1/16
See application file for complete search history.

(56) References Cited

U.S. PATENT DOCUMENTS

| | | | |
|---|---|---|---|
| 2019/0387377 A1* | 12/2019 | Zhang | H04W 84/005 |
| 2020/0029340 A1* | 1/2020 | He | H04W 72/10 |
| 2020/0252910 A1* | 8/2020 | Wu | H04L 5/0055 |
| 2021/0021387 A1* | 1/2021 | Chae | H04L 1/1893 |
| 2021/0105104 A1* | 4/2021 | Cao | H04L 5/0094 |
| 2021/0127364 A1* | 4/2021 | Panteleev | H04W 72/0446 |
| 2021/0314917 A1* | 10/2021 | Lee | H04W 24/08 |

(Continued)

OTHER PUBLICATIONS

International Search Report and Written Opinion—PCT/US2021/014219—ISA/EPO—dated May 3, 2021.

(Continued)

*Primary Examiner* — Phuc H Tran
(74) *Attorney, Agent, or Firm* — Procopio, Cory, Hargreaves & Savitch LLP

(57) ABSTRACT

An apparatus receives, in a transmission from a second UE, an indication of reserved resources for the second UE. The apparatus measures a received power of the transmission from the second UE. The apparatus excludes the reserved resources indicated by the second UE from a set of candidate resources based on the received power of the transmission from the second UE meeting a threshold, where the threshold is based at least in part on whether the reserved resources are associated with a retransmission.

28 Claims, 9 Drawing Sheets

(56) References Cited

U.S. PATENT DOCUMENTS

2022/0109546 A1* 4/2022 Panteleev ............. H04L 1/1887
2022/0150893 A1* 5/2022 Deng .................... H04W 76/14

OTHER PUBLICATIONS

TCL Communication: "Resource Allocation for NR Sidelink—Mode 2", 3GPP Draft, 3GPP TSG RAN WG1 #100-E, R1-2000430,3rd Generation Partnership Project (3GPP), Mobile Competence Centre; France, vol. RAN WG1, No. e-Meeting, Feb. 24, 2020-Mar. 6, 2020, Feb. 14, 2020 (Feb. 14, 2020), XP051852861, 6 pages, Retrieved from Internet: URL: https://ftp.3gpp.org/tsg_ran/WG1_RL1/TSGR1_100_e/Docs/R1-2000430.zip R1-2000430_TCL_Resource allocation for NR sidelink Mode 2.docx [retrieved on Feb. 14, 2020] section 4.2.

* cited by examiner

ADAPTIVE SENSING BASED ON NUMBER OF RETRANSMISSIONS

CROSS REFERENCE TO RELATED APPLICATION(S)

This application claims the benefit of priority of Provisional Application Ser. No. 62/980,860, entitled "Adaptive Sensing Based on Number of Retransmissions" and filed on Feb. 24, 2020, which is expressly incorporated by reference herein in its entirety.

BACKGROUND

Technical Field

The present disclosure relates generally to communication systems, and more particularly, to sidelink communications.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Aspects of wireless communication may comprise direct communication between devices, such as in V2X, V2V, and/or other D2D communication. There exists a need for further improvements in V2X, V2V, and/or other D2D technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first user equipment (UE). The apparatus receives, in a transmission from a second UE, an indication of reserved resources for the second UE. The apparatus measures a received power of the transmission from the second UE. The apparatus excludes the reserved resources indicated by the second UE from a set of candidate resources based on the received power of the transmission from the second UE meeting a threshold, where the threshold is based at least in part on whether the reserved resources are associated with a retransmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
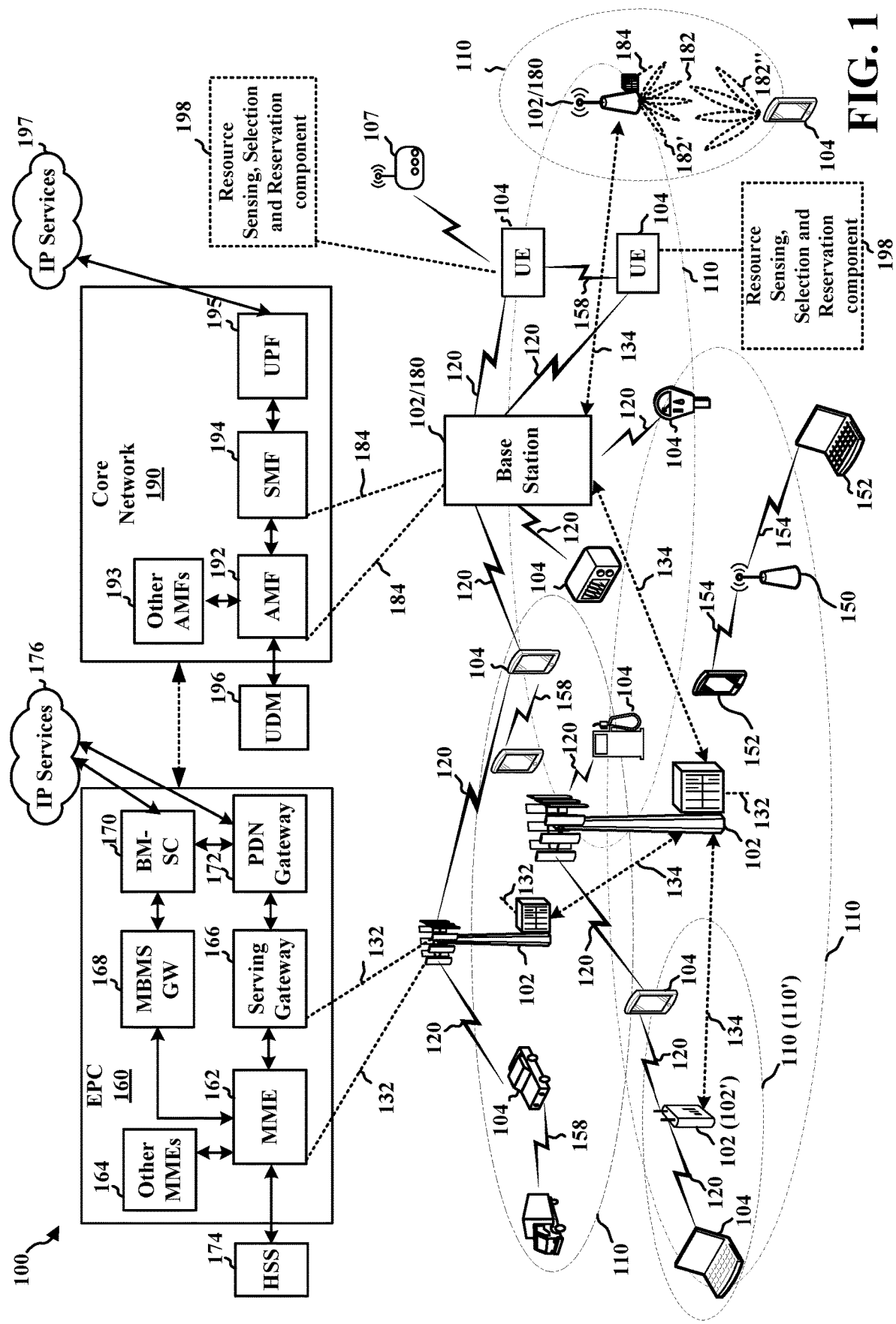
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In a distributed resource allocation mode, a UE may transmit data using sidelink resources that are selected by the UE based on a sensing mechanism. As part of the sensing mechanism, the UE may monitor for sidelink resources reservations in order to determine (e.g., sense) sidelink resources that are reserved by other UE(s). The UE may select a sidelink transmission resource that has not been reserved by another sidelink UEs. In some examples, the UE may also determine to use or reuse resource(s) that has been reserved by another sidelink UE(s), such as when the data (e.g., PSSCH) to be transmitted by the sidelink UE has a higher priority. At times, this may cause resource collision (e.g., interference) when multiple sidelink UEs are transmitting data using same sidelink (e.g., frequency and time) resources.

Aspects presented herein may enable a sidelink UE to reuse/reclaim reserved resource(s) in a more efficient manner, by using reserved resources that are less likely to be used by the UEs who reserved them. As presented herein, the UE may apply different thresholds for resources reserved for initial transmission and reservations for retransmissions. The aspects presented herein may help to increase sidelink resource usage while avoiding resource waste and/or resource collisions.

FIG. 1 is a diagram illustrating an example of a wireless communications system and an access network 100. In one aspect of the present disclosure, a first UE (e.g., the UE 104) may determine whether to use a reserved resource based at least in part on the number of retransmissions associated with the reserved resource and the RSRP of the sidelink message (e.g., SCI) that reserves the resource. In one aspect, the first UE may include a resource sensing, selection and reservation component 198 configured to receive, in a transmission from a second UE, an indication of reserved resources for the second UE. The resource sensing, selection and reservation component 198 may further be configured to measure a received power of the transmission from the second UE. The resource sensing, selection and reservation component 198 may further be configured to determine to exclude the reserved resources indicated by the second UE if the received power of the transmission from the second UE meets a threshold, wherein the threshold is based at least in part on whether the reserved resources are associated with a retransmission.

The wireless communications system (also referred to as a wireless wide area network (WWAN)) includes base stations 102, UEs 104, an Evolved Packet Core (EPC) 160, and a Core Network (e.g., 5GC) 190. The base stations 102 may include macro cells (high power cellular base station) and/or small cells (low power cellular base station). The macro cells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for NR (collectively referred to as Next Generation RAN (NG-RAN)) may interface with Core Network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or Core Network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The Core Network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the Core Network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
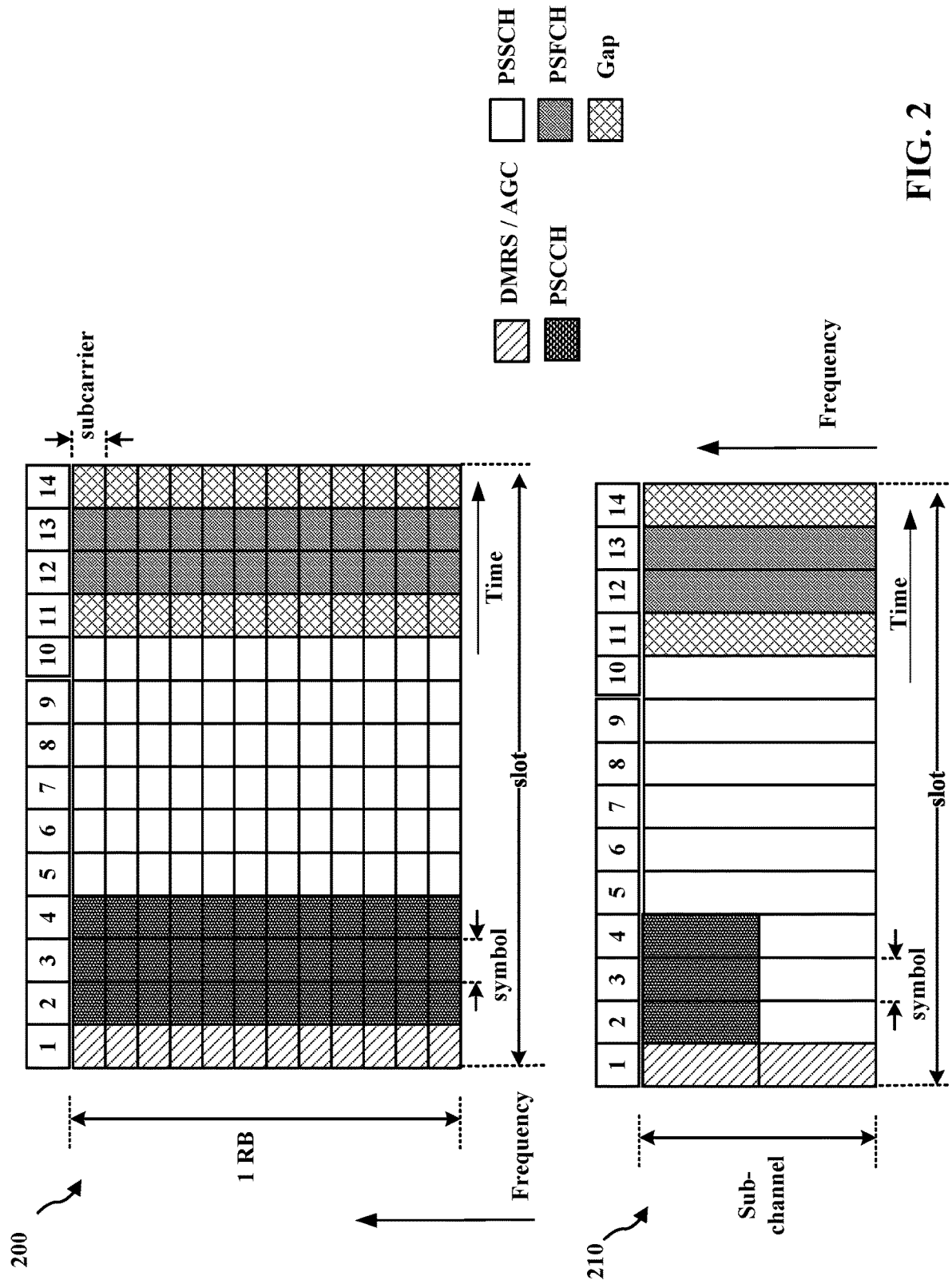
FIG. 2 illustrates example aspects of a sidelink slot structure.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more sub-channels. As a non-limiting example, the resource pool may include between 1-27 sub-channels. A PSCCH size may be established for a resource pool, e.g., as between 10-100% of one sub-channel for a duration of 2 symbols or 3 symbols. In some examples, the first symbol of the subframe may be a symbol for automatic gain control (AGC) usage (e.g., an AGC symbol), and the last symbol may be a symbol for transmit/receive switching time usage. The AGC symbol may be used to adjust an operating point by a receiving end. The diagram 210 in FIG. 2 illustrates an example in which the PSCCH occupies about 50% of a sub-channel, as one example to illustrate the concept of PSCCH occupying a portion of a sub-channel. The physical sidelink shared channel (PSSCH) occupies at least one sub-channel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may comprise control information in PSCCH and some Res may comprise demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some examples.

Figure 3:
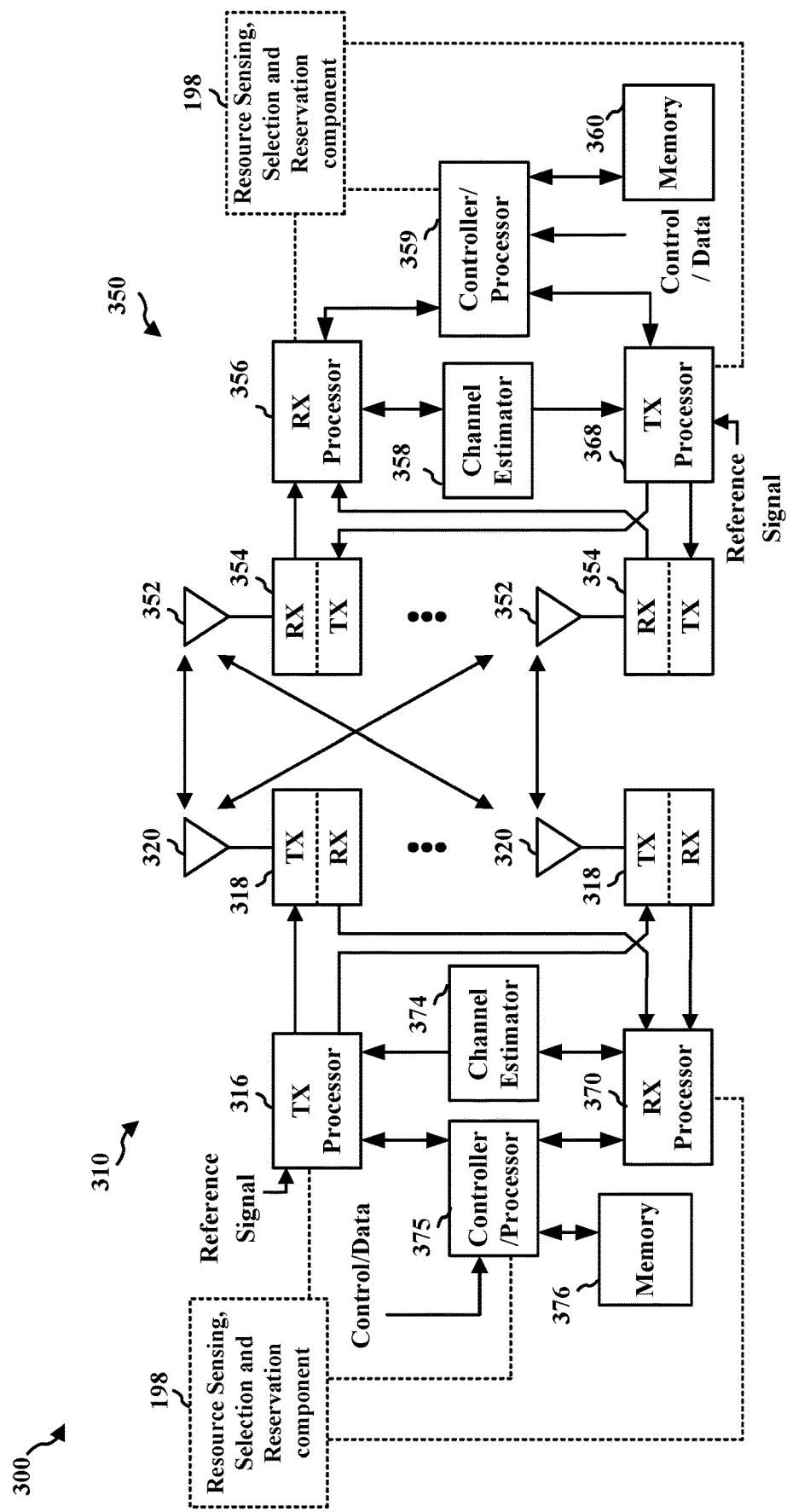
FIG. 3 is a diagram illustrating an example of a first device and a second device involved in wireless communication based, e.g., on sidelink communication.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 (TX). Each transmitter 318 (TX) may modulate an RF carrier with a respective spatial stream for transmission.

At the device 350, each receiver 354 (RX) receives a signal through its respective antenna 352. Each receiver 354 (RX) recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354 (TX). Each transmitter 354 (TX) may modulate an RF carrier with a respective spatial stream for transmission.

The transmission is processed at the device 310 in a manner similar to that described in connection with the receiver function at the device 350. Each receiver 318 (RX) receives a signal through its respective antenna 320. Each receiver 318 (RX) recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, the controller/processor 359, the TX processor 316, the RX processor 370, or the controller/processor 375 may be configured to perform aspects in connection with the resource sensing, selection and reservation component 198 of FIG. 1.

Sidelink communication has become more and more important as automobile manufacturers are moving toward fully automated vehicles. One, non-limiting example of sidelink communication is V2X. V2X communication may utilize synchronous timing for communication where V2X users may use a same reference timing. Devices communicating based on V2X, or other D2D based communications, may determine radio resource (e.g., sub-channels in the frequency domain) utilization to avoid collisions with other devices.

Sidelink communication that is exchanged directly between sidelink UEs (or sidelink devices) may include discovery messages for sidelink UEs to find nearby UEs. Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a sidelink UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. The sidelink transmission and/or the resource reservation may be periodic or aperiodic, where a UE may reserve resources for transmission in a current slot and up to two future slots (discussed below). These resource allocation mechanisms for sidelink communication may provide power savings, e.g., at a physical layer or a medium access control (MAC) layer. Power savings may be helpful in sidelink applications such as public safety applications, commercial applications, wearables, etc., which may include both periodic and aperiodic traffic.

For example, for a sidelink UE that is transmitting data based on a sensing mechanism, or resource allocation mode 2, the sidelink UE may determine (e.g., sense) whether the selected sidelink resource has been reserved by other UE(s) before selecting a sidelink resource for a data transmission. If the sidelink UE determines that the sidelink resource has not been reserved by other sidelink UEs, the sidelink UE may use the selected sidelink resource for transmitting the data. In some examples, the UE may also determine to use or reuse resource(s) that has been reserved by another sidelink UE(s), such as when the data (e.g., PSSCH) to be transmitted by the sidelink UE has a higher priority. At times, this may cause resource collision (e.g., interference) when multiple sidelink UEs are transmitting data using same sidelink (e.g., frequency and time) resources.

A sidelink UE may estimate or determine which radio resources (e.g., sidelink resources) may be in-use and/or reserved by others by detecting and decoding sidelink control information (SCI) transmitted by other sidelink UE(s) or stations. The sidelink UE may exclude resources that are used and/or reserved by other sidelink UEs from set of candidate resources, and may use unused/unreserved resources in the candidate set for sidelink transmissions (e.g., including SCI and/or data). The number of sidelink resources (e.g., sub-channels per subframe) that may be reserved by a sidelink UE may vary depending on the size of data to be transmitted by the sidelink UE. Although the example is described for a sidelink UE receiving reservations from another sidelink UE, the reservations may also be received from an RSU or other device communicating based on sidelink.

Figure 4:
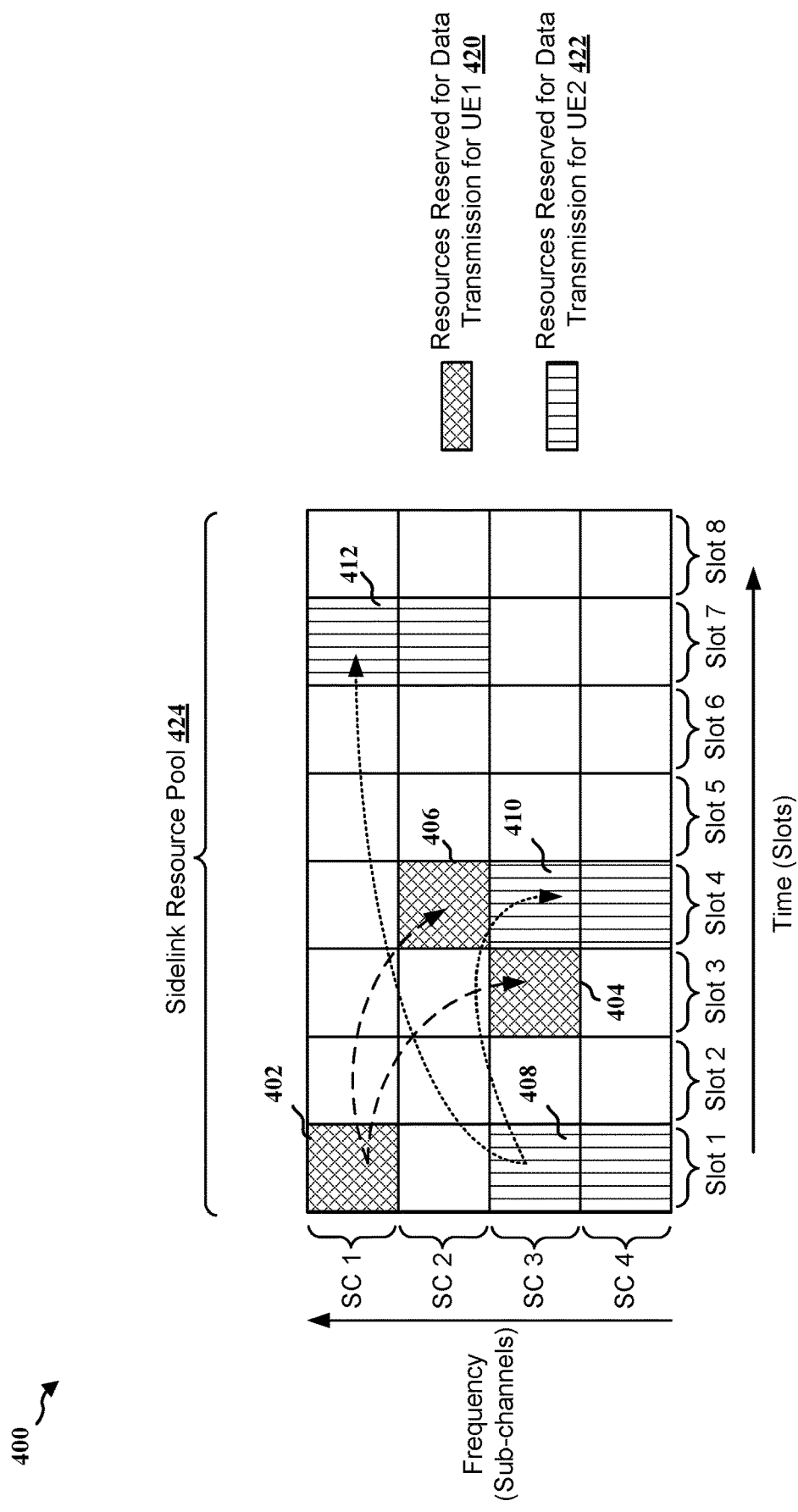
FIG. 4 is a diagram illustrating an example resource allocation and reservation.

FIG. 4 is a diagram 400 showing an example of resource reservations for sidelink transmissions in a sidelink resource pool 424. The resource allocation for each UE (e.g., a sidelink device) may include one or more sub-channels (SCs) in the frequency domain (e.g., SC1 to SC 4) and a slot in the time domain. The UE may use resources in a current slot to perform data transmission, and may reserve resources in future slots for data retransmissions. In one example, as shown by diagram 400 of FIG. 4, a sidelink UE, such as a first UE 420 or a second UE 422, may reserve up to two future slots for retransmissions. The resource reservation may be limited to a window or a pool with defined slots and sub-channels. For example, as shown by diagram 400 of FIG. 4, a sidelink resource pool 424 (which may also be referred as a resource selection window) may include an eight (8) slots by four (4) sub-channels window, which may provide thirty-two (32) available resource blocks in total. The first UE 420 (e.g., UE1) may reserve a resource 402 that includes a sub-channel (e.g., SC 1) in a current slot (e.g., slot 1) for data transmission, and may reserve two additional future sub-channels and slots within the sidelink resource pool 424 for data retransmissions. For example, the first UE 420 may reserve a resource 404 that includes a sub-channel (e.g., SC 3) at slots 3 and a resource 406 that includes a sub-channel (e.g., SC 2) at slot 4 for future retransmissions as shown by FIG. 4. Although the example shows a reservation of two additional slots of resources, the reservation may be for only one additional slot of resources or may be a reservation only for a slot for an initial transmission without the additional reserved resources. After selecting and/or reserving resources for transmission and/or retransmission, the first UE 420 may transmit its resource reservation information to other UEs, such as the second UE 422. For example, the first UE 420 may transmit its resource reservation information in SCI, such as using a reservation resource field in the SCI. The SCI may be a first stage SCI. Similarly, the second UE 422 may reserve a resource 408 that includes two sub-channels (e.g., SC 3 and SC 4) at time slot 1 for its current data transmission, and may reserve a resource 410 that includes two sub-channels (e.g., SC 3 and SC 4) at time slot 4 and a resource 412 that includes two sub-channels (e.g., SC 1 and SC 2) at time slot 7 for retransmissions. After selecting and/or reserving resources for transmission and/or retransmission, the second UE 422 may also transmit its resource reservation information to other UE(s), such as the first UE 420, through SCI.

If a third UE (e.g., UE 3) is to select one or more resources from the sidelink resource pool 424 for data transmission and/or retransmission, the third UE may first decode SCIS within a time period to identify which resources (e.g., candidate resources) are available, such as resources that have not been reserved by other UEs. Then, the third UE may use unreserved resources for data transmission. For example, the third UE may receive and decode SCIS transmitted from the first UE 420 and the second UE 420, and the third UE may determine that resources 402, 404, 406, 408, 410 and 412 within the sidelink resource pool 424 have been used/reserved by the first UE 420 and the second UE 422. As such, the third UE may exclude these resources from its candidate resources, and the third UE may select other unreserved/unused resources (e.g., available sub-channels and time slots) as the candidate resources for data transmission and retransmissions, which may be based on a number of adjacent sub-channels in which the data (e.g., packet) to be transmitted can fit.

As mentioned above, a sidelink resource reservation may be periodic or aperiodic. If the resource reservation is configured to be periodic, the periodic resource reservation may be turned on or off by a configuration in a sidelink resource pool. Also, a UE may be configured to continue monitoring resource reservation messages (e.g., SCIs) sent by other UE(s) or stations so that the UE may maintain a sensing history regarding which resources are being used and/or reserved. Then, the UE may perform resource selection based at least in part on the sensing history when the UE has a packet for transmission. The UE may maintain reservation information for a period of time, e.g., within a sensing window (e.g., the sensing window 506). The length of the sensing window may be configured for the UE, such as by a base station. Each resource reservation may have a priority level indicated in the SCI, such that a transmission (e.g., a packet) with a higher priority reservation may pre-empt a transmission with a lower priority reservation.

A UE may perform signal/channel measurement for a sidelink resource that has been reserved and/or used by other UE(s), such as by measuring the reference signal receive power (RSRP) of the message (e.g., the SCI) that reserves the sidelink resource. Based at least in part on the signal/channel measurement, the UE may consider using/reusing the sidelink resource that has been reserved by other UE(s). For example, a UE may consider a reserved resource to be available when the measured RSRP for the message reserving the resource is below a threshold, and then the UE may use/reuse the reserved resource for transmission. When the measured RSRP is below the threshold, it may indicate that the UE reserving the resource may be distant, and the use/reuse of the reserved resource may be less likely to cause interference or impact to that UE. In some examples, the threshold for the RSRP may be determined or changed based on the amount of available resources in a resource selection window. For example, if the amount of available resources is below a threshold/percentage (e.g., below 20%) within a resource selection window, the UE may be configured to use an increased/higher RSRP threshold so that the UE is more likely to be able to reuse reserved resources. In addition, a sidelink (or packet) transmission or retransmission may be configured with a packet delay budget (PDB), which may provide a time in which the sidelink transmission or retransmission is to be transmitted by a UE. If the UE is unable to transmit the sidelink transmission within the PDB, the UE may be configured to abort or discard the transmission, and restart the sidelink resource sensing and selection process. Aspects presented herein may enable a UE to find a balance between excluding reserved resources (e.g., to avoid collisions with other UEs) and reusing reserved resources (e.g., to increase resource usage), such that the UE may be able to select sidelink resources that meet packet delay budgets of its transmissions while avoiding resource collision.

Figure 5:
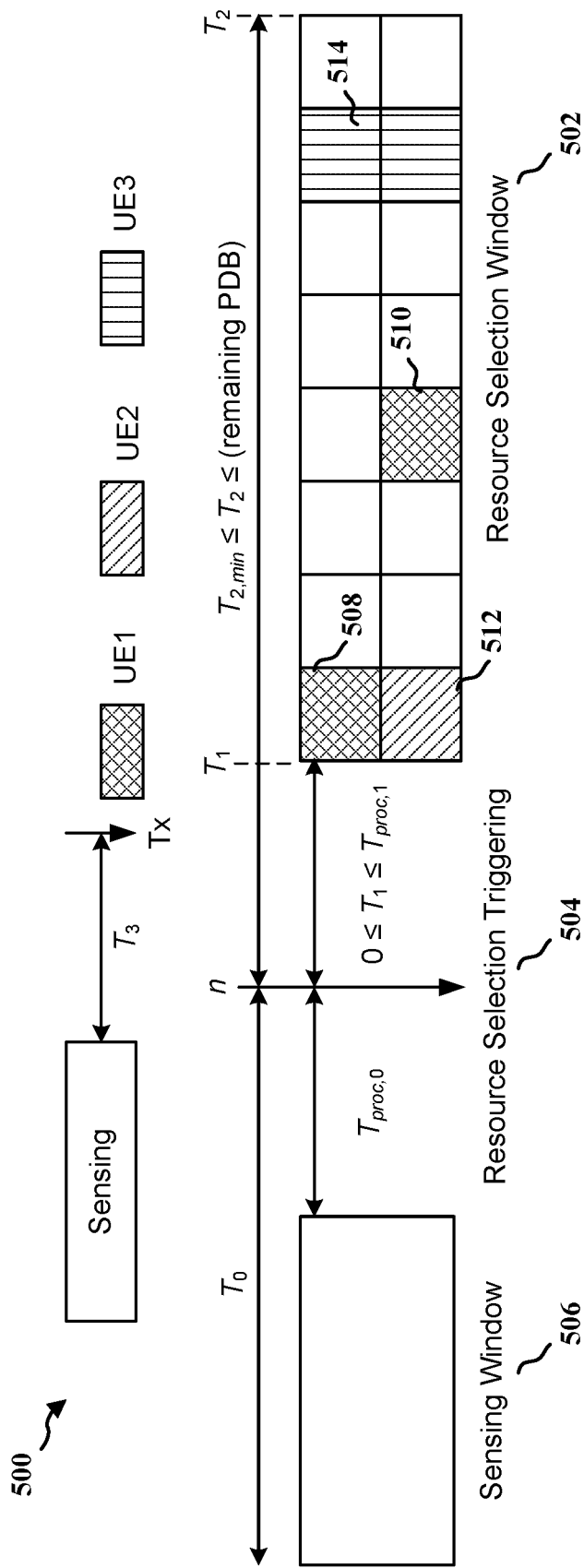
FIG. 5 is a diagram illustrating an example timeline for a sensing-based resource selection

FIG. 5 is an example showing a timeline 500 for a sensing-based resource selection. A UE may select radio resources from a resource selection window 502, which is illustrated as having sixteen (16) resource blocks formed by two sub-channels and eight slots in this example. The duration of the resource selection window 502 may be represented by $[n+T_1, n+T_2]$, where n may represent the time a resource selection is triggered, such as shown at 504 when the UE is to select a sidelink resource for transmission. $T_1$ may represent the starting of the resource selection window 502 and $T_2$ may represent the end of the resource selection window 502. The length of the resource selection window 502 may vary depending on the configuration, and may be configured for the UE via an upper layer (e.g., from 20 ms to 100 ms etc.). In some examples, the value of $T_1$ may be selected from a time between zero (0) and the time it takes the UE to process and implement the resource selection (e.g., $T_{proc,1}$), and $T_2$ may be selected from a time between $T_{2,min}$ and the remaining of a PDB duration associated with the transmission. In some examples, $T_{2,min}$ may be configured per each sidelink priority value which may be indicated in SCI from the following set of values: 1, 5, 10, $20 \cdot 2^{\mu-1}$ slots, where $\mu$=1, 2, 3, 4 for 15, 30, 60, 120 kHz sub-carrier spacing (SCS) respectively. PDB may be used to define the upper limit of a delay suffered by a packet between the UE and policy and charging enforcement function (PCEF).

As a UE may sense and decode sidelink messages (e.g., SCIs) from other UE(s), a sensing history (or resource use/reservation history) may be recorded/determined from a sensing window 506 and used by the UE to determine which resources in the resource selection window 502 are reserved by other UE(s). For example, the sensing window 506 may represent a time duration prior to the resource selection during which the UE may collect resource reservation related information from other UEs (e.g., via their SCIs). In one example, the time duration may be the last 1000 ms prior to the resource selection triggering at 504. In other examples, the sensing window 506 may have a duration between 100 ms to 1100 ms, as represented by $T_0$ in FIG. 5, minus the time it takes the UE to process the sensing window 506 (e.g., $T_{proc,0}$).

Based on the resource reservation related information obtained during the sensing window 506, the UE may determine available candidate resources for the resource selection window 502. For example, based on the resource reservation information decoded from SCIs of other UEs (e.g., UE1, UE2 and UE3), the UE may discover that UE1 has transmitted a data during the sensing window 506 and has reserved resource blocks 508 and 510 in the resource selection window 502 for retransmission of the data. Similarly, based on the sensing window 506, the UE may discover that resource blocks 512 and 514 have been reserved by UE2 and UE3 for their retransmissions respectively as shown in FIG. 5. As such, the UE may determine that resource blocks 508, 510, 512 and 514 in the resource selection window 502 are not available for selection and may excluded these resource blocks from selection. Then, the UE may identify the remaining resource blocks as available candidate resources. The UE may perform the sensing up to a defined duration (e.g., $T_3$) before its transmission.

At times, it may not be easy for a UE to find available resources in a sidelink channel (e.g., within a resource selection window) when the sidelink channel is congested. In some examples, the congestion may be caused by the aforementioned sensing-based (e.g., the resource reservation) mechanism when a large amount of resources are being excluded from candidate resources because they have been reserved by other UEs for retransmissions. For example, referring back to FIG. 4, the UE 420 may have reserved resources 404 and 406 for retransmission and the UE 422 may have reserved resources 410 and 412 for retransmissions. Thus, these resources may be excluded from other UE's resource selection. In some examples, a UE that reserves a resource may not use the reserved resource. For example, the UE 420 may transmit a packet using the resource 402 and the UE 420 may have also reserved resources 404 and 406 for retransmission of the packet. However, if the transmission of the packet using the resource 402 is successfully, such as when a positive feedback (e.g., HARQ ACK) is received for the transmission, the UE 420 may determine to skip or abort the retransmissions. For example, the UE 420 may determine not to use the reserved resources 404 and 406 when the transmission using the resource 402 is successful. This may cause the resources 404 and 406 to be excluded from other UEs' resource selection, and the resources 404 and 406 may become wasted because they are not utilized by the UE 420 that reserves them. In addition, when a sidelink channel is congested, packet collisions may also be more likely to occur when multiple UEs are attempting to transmit/retransmit packets across the sidelink channel at the same time.

In one aspect of the present disclosure, to avoid excessive resources exclusion/waste due to resources being reserved for retransmission but not used, a UE may be configured to monitor HARQ-feedback of other UE(s) to determine the likelihood of whether a reserved resource is going to be used by the UE(s) that reserves the resource. For example, referring back to FIG. 4, the UE 420 may use the resource 402 (e.g., at sub-channel SC 1 and slot 1) for data transmission, and the UE 420 may reserve resources 404 and 406 (e.g., at sub-channels SC 3 and slots 3, and SC 2 and slot 4) for data retransmissions. A transmitting UE may monitor whether a negative acknowledgement (NACK) is received by the UE 420 after the UE 420 transmits the data using the resource 402. If a NACK is received by the UE 420, the transmitting UE may assume that the data transmission from the UE 420 was not successful, and that the UE 420 is likely to use the reserved resources 404 and/or 406 for retransmissions. On the other hand, if a NACK is not received by the UE 420, the transmitting UE may assume/determine that the data transmission from the UE 420 using the resource 402 is successful and that the UE 420 may skip retransmissions of the data using the reserved resources. As such, the transmitting UE may reclaim/reuse resources (e.g., resources 404 and/or 406) reserved by the UE 420 for its own use (e.g., for its data transmission). However, monitoring HARQ-feedback for transmissions of other UEs may increase the workload of a UE.

In other examples, a UE may measure reference signal receive power (RSRP) of a sidelink transmission (e.g., SCI in PSCCH and/or PSSCH) from another UE, and the UE may estimate whether one or more reserved resources may be reclaimed for their use based at least in part on the measured RSRP of the sidelink transmission. In some examples, the RSRP may correspond, e.g., to the linear average over the power contributions of the resource elements that carry a signal, such as demodulation reference signals. The power per resource element may be determined from the energy received during the useful part of the symbol, e.g., excluding the cyclic prefix. Thus, when a UE is selecting a sidelink resource for transmission, the UE may be configured to exclude resources that are reserved by sidelink messages (e.g., SCIs) having measured RSRP higher than a threshold. On the other hand, if the RSRP of a sidelink message reserving a resource does not exceed the threshold, the UE may not exclude the reserved resource, and the UE may select the reserved resource for its transmission.

Figure 6:
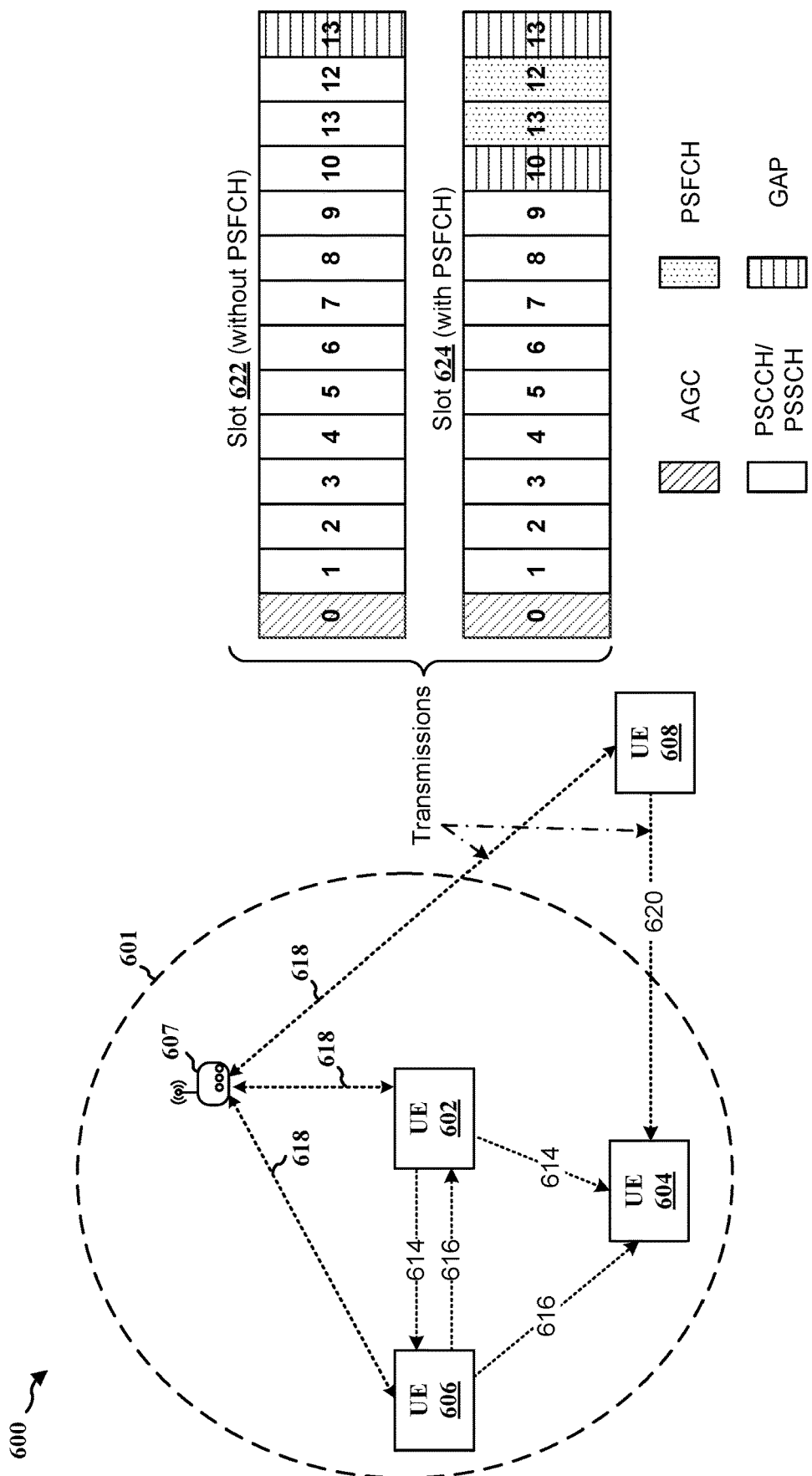
FIG. 6 illustrates an example of wireless communication between devices based on sidelink communication.

FIG. 6 a diagram 600 illustrating an example of sidelink wireless communication between devices based on sidelink communication. One, non-limiting example of sidelink communication is V2X. Although the aspects are described for a transmitting device and a receiving device to distinguish between the two devices, both devices may be capable of transmission and reception. Although example aspects are described for UEs in order to illustrate the concept, the aspects may be applied by other sidelink devices, as well, such as a road side unit (RSU), etc. A UE 602 may transmit a transmission 614, e.g., comprising a control channel and/or a corresponding data channel, that may be received by receiving UEs 604, 606. The control channel may include information for decoding a data channel and may also be used by receiving device to avoid interference by refraining from transmitting on the occupied resources during a data transmission. The number of transmission time intervals (TTIs), as well as the RBs that will be occupied by the data transmission, may be indicated in a control message from the transmitting device. The UEs 602, 604, 606, 608 may each have the capability to operate as a transmitting device in addition to operating as a receiving device. Thus, UEs 606, 608 are illustrated as transmitting transmissions 616 and 620 respectively. The transmissions 614, 616, 620 may be broadcast, multicast, or unicast to nearby devices. For example, UE 602 may transmit communication (e.g., data) for receipt by other UEs within a range 601 of UE 602. Additionally, or alternatively, the RSU 607 may receive communication from and/or transmit communication 618 to UEs 602, 606, 608.

The transmissions 614, 616, 620 and/or the communication 618 may be based on a slot structure. The slot structure may include any of the aspects described in connection with FIG. 2. For example, as shown by a slot 622 and a slot 624, the transmission may be in a unit of slots (e.g., with RRC configured starting and ending symbols), and each slot may include 14 symbols (e.g., symbol #0 to symbol #13). The first symbol (e.g., symbol #0) may be a repetition of the second symbol for AGC purposes, such that the first symbol may also be referred to as an AGC symbol in some examples. After the last symbol (e.g., symbol #12), there may be a one-symbol gap (e.g., symbol #13) to allow a UE to perform time division duplex (TDD) switching. As shown by the slot 622, for a slot without physical sidelink feedback channel (PSFCH) configured (discussed below in connection with FIG. 5), a UE may be configured to use symbols #0 to #12 for physical sidelink control channel (PSCCH) and/or physical sidelink shared channel (PSSCH) transmission, and symbol #13 may be left as a gap. As shown by the slot 624, for a slot with PSFCH configured, a UE may be configured to use symbols #0 to #9 for PSCCH/PSSCH transmission and use symbols #11 and #12 for PSFCH transmission, and symbol #13 may be left as a gap.

Aspects presented herein may enable a sidelink UE to determine whether to reuse/reclaim reserved resource(s) in a more efficient manner, such that reserved resources that are less likely to be used by UEs that reserve them may be reuse/reclaim by the sidelink to reduce resource waste while also avoiding resource collisions. In one aspect of the present disclosure, a sidelink UE may determine whether to use a reserved resource based at least in part on the number of retransmissions associated with the reserved resource and the RSRP of the sidelink message (e.g., SCI) that reserves the reserved resource.

Figure 7:
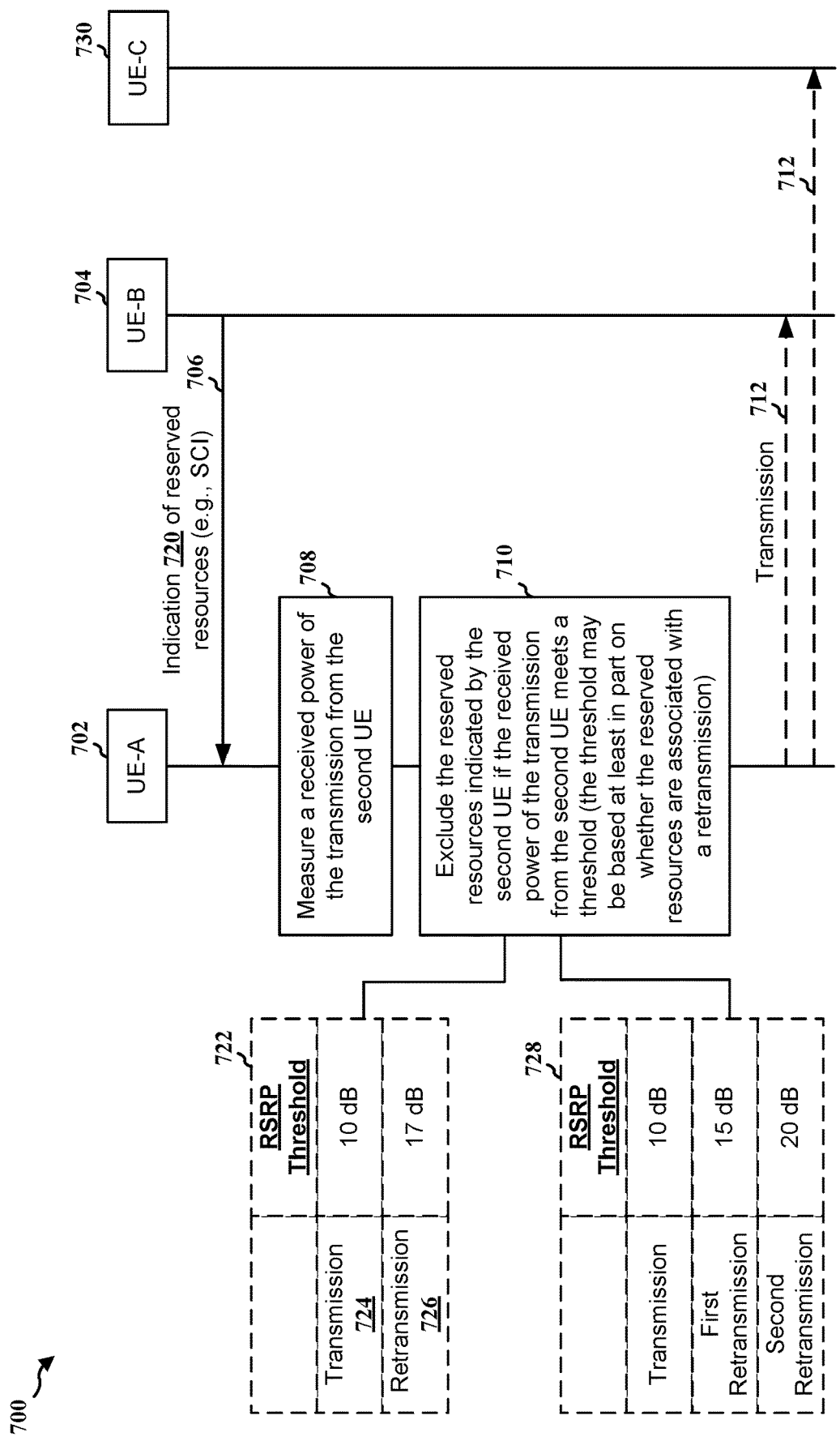
FIG. 7 is an example communication flow between a first UE and a second UE according to aspects of the present disclosure.

FIG. 7 is a communication flow 700 illustrating an example of a UE reclaiming a reserved resource based on the number of retransmissions associated with the reserved resource accordingly to aspects of the present disclosure. The communication may be based on V2X, V2V, or other D2D based communication involving transmitting directly from a transmitting device to a receiving device. The communication transmitted from a transmitting device may be broadcast and received by multiple receiving devices within the transmission range of the transmitting device, as described in connection with FIG. 6. Optional aspects may be illustrated with a dashed line.

At 706, a first UE 702 may receive an indication 720 from a second UE 704, where the indication 720 may indicate one or more reserved resources for the UE 704 in a sidelink channel, such as within a resource selection window of the sidelink channel. In some examples, the second UE 704 may transmit or include the indication 720 in an SCI message.

At 708, after the second UE 704 transmits the indication 720 to the first UE 702, the first UE 702 may measure the received power (e.g., the RSRP) of the indication 720 (or the sidelink message/SCI carrying the indication 720).

At 710, the first UE 702 may determine whether to exclude one or more reserved resources indicated by the second UE 704 based at least in part on the measured received power and whether the one or more reserved resources are associated with retransmission. In one aspect, as shown by a table 722, a first threshold (e.g., a lower threshold) may be defined for resources that are reserved for initial transmission 724 (e.g., the resources 402 and 408), and a second threshold (e.g., a higher threshold) may be defined for resources that are reserved for retransmission(s) 726 (e.g., the resources 404, 406, 410 and 412). Based on the defined thresholds, the first UE 702 may use a resource reserved by the second UE 704 if the resource is reserved by the second UE 704 for an initial transmission and the RSRP of the indication 720 (e.g., the SCI that indicates the resource reservation) is below the first threshold. Similarly, if the resource is reserved by the second UE 704 for retransmission, the first UE 702 may use the resource if the RSRP of the indication 720 is below the second threshold. On the other hand, the first UE 702 may not use a resource reserved by the second UE 704 if the resource is reserved by the second UE 704 for an initial transmission and the RSRP of the indication 720 is above the first threshold, or if the resource is reserved by the second UE 704 for retransmission and the RSRP of the indication 720 is above the second threshold. For example, as shown by the table 722, the first threshold may be configured to be 10 dB for the initial transmission 724 and the second threshold may be configured to be 17 dB for the retransmission 726. If the indication 720 indicates that the second UE 704 reserves a first resource for initial transmission and reserves a second resource and a third resource for retransmissions, the first UE 702 may not use/reclaim the first resource if the measured RSRP of the indication is 15 dB (e.g., 15 dB>the first threshold (10 dB)). On the other hand, the first UE 702 may use the second resource and/or the third resource as the measured RSRP is below the second threshold (e.g., 15 dB<the second threshold (17 dB). By configuring a higher threshold for subsequent retransmission resources, resources that are reserved for retransmissions may have higher chances of being reclaimed/reused by other UEs, e.g., to be included as candidate resources by the first UE 702 for resource selection. A UE may determine whether a resource is reserved for initial transmission or retransmission based on reservation-related information included in the SCI that indicates the resource reservation (e.g., the indication 720).

In another aspect, different thresholds may further be defined for different number of retransmissions. For example, as shown by a table 728 in FIG. 7, a first threshold (e.g., 10 dB) may be defined for resources that are reserved for initial transmission, a second threshold (e.g., 15 dB) may be defined for resources that are reserved for first retransmission, and a third threshold (e.g., 20 dB) may be defined for resources that are reserved for second retransmissions, and so on. Based on the defined thresholds, the first UE 702 may use a resource reserved by the second UE 704 if the resource is reserved for an initial transmission and the RSRP of the indication 720 is below the first threshold, or if the resource is reserved for a first retransmission and the RSRP of the indication 720 is below the second threshold, or if the resource is reserved for a second retransmission and the RSRP of the indication 720 is below the third threshold, etc. On the other hand, the first UE 702 may not use a resource reserved by the second UE 704 if the resource is reserved for an initial transmission and the RSRP of the indication 720 is above the first threshold, or if the resource is reserved for a first retransmission and the RSRP of the indication 720 is above the second threshold, or if the resource is reserved for a second retransmission and the RSRP of the indication 720 is above the third threshold, etc. For example, If the indication 720 indicates that the second UE 704 reserves a first resource for initial transmission, a second resource for a first retransmission, and a third resource for a second retransmission, the first UE 702 may not use/reclaim the first resource or the second resource if the measured RSRP of the indication 720 is 17 dB (e.g., 17 dB>the first threshold (10 dB) or the second threshold (15 dB)). On the other hand, the first UE 702 may use the third resource as the measured RSRP is below the third threshold (e.g., 17 dB<the third threshold (20 dB)). By configuring different thresholds for different retransmission resources, resources that are reserved for higher number of retransmissions may have higher chances of being reclaimed/reused by other UEs. As higher number of retransmissions may be less likely to be used by UEs that reserve them, aspects presented herein may improve resource reuse/reclaim for other UEs. In some examples, the first UE 702 may determine the number of retransmissions for a reserved resource based on a redundancy version (RV) identifier (ID) that is associated with the retransmission/reserved resource. For example, the second UE 704 may indicate, e.g., through the indication 720, the number of retransmissions (e.g., first retransmission, second retransmission etc.) associated with one or more reserved resources by associating the one or more reserved resource with RV IDs.

At 712, if the first UE 702 determines that one or more one or more reserved resources indicated by the second UE 704 have a measured RSRP (e.g., RSRP of the indication 720) below their respective thresholds (e.g., the first threshold, the second threshold and/or the third threshold, etc.), the first UE 702 may reuse/reclaim the one or more reserved resources for its transmission. For example, the first UE 702 may reuse/reclaim the one or more resources to transmit data to the second UE 704 or to another UE 730, etc. In other words, the UE 702 may include the one or more reserved resource as candidate resources in its resource selection, or may determine not to exclude the reserved resource as a candidate resource.

As such, a UE may be configured to apply different thresholds for different reserved resources based at least in part on whether the reserved resources are associated with retransmissions. For example, the UE may use one threshold to determine whether to exclude resources reserved for initial transmission from its resource selection, and may use other (e.g., higher) threshold(s) to determine whether to exclude resources reserved for retransmission from its resource selection. As an illustration, referring back to FIG. 4, a UE may receive a transmission (e.g., SCI) from the first UE 420 indicating that the resource 402 has been reserved by the first UE 420 for an initial transmission, and that the resources 404 and 406 have been reserved by the first UE 420 for a first retransmission and a second retransmission respectively. The UE may determine an RSRP threshold for initial transmission and a different RSRP threshold for first retransmission. The RSRP threshold for the first retransmission (e.g., for the resource 404) may be higher than the RSRP threshold for the initial transmission. Similarly, the UE may further determine RSRP threshold for the second retransmission (e.g., for the resource 406), the RSRP threshold for the second retransmission may be the same as the RSRP threshold for the first retransmission or it may be a different threshold value, such as a threshold value higher than the first retransmission. While the example shows two reserved retransmissions, it may also be applied to resource reservations with more than two retransmissions (e.g., 5, 10, 15 retransmissions etc.). The UE may be configured to use different RSRP thresholds for each number of retransmission (e.g., first retransmission, second retransmission, x retransmission etc.) or for each group of retransmission (e.g., first to second retransmissions, third to fourth retransmissions, etc.).

Aspects presented herein may improve resource reuse/reclaim while avoiding resource collision as resource reservations for higher retransmission may have lower probability of being used by the UE who reserves them than lower retransmission resource reservations. For examples, if a UE reserves two future slots for two retransmissions, the second reserved retransmission may be less likely to occur (e.g., lower probability of being used) than the first reserved retransmission because the UE may successfully retransmit the data in the first retransmission. By using higher RSRP thresholds for higher retransmission resource reservations, the UE may reduce resource exclusion from its resource selection window (e.g., 502 in FIG. 5). Thus, the UE may have higher probability of reclaiming/reusing resources that are reserved but not used. In other words, by using one threshold for initial transmission resource and higher thresholds for subsequent retransmission, subsequent reserved resources for retransmissions will have higher chances to be included in candidate resources for resource selection. This in turn reduces resource exclusion and waste.

Figure 8:
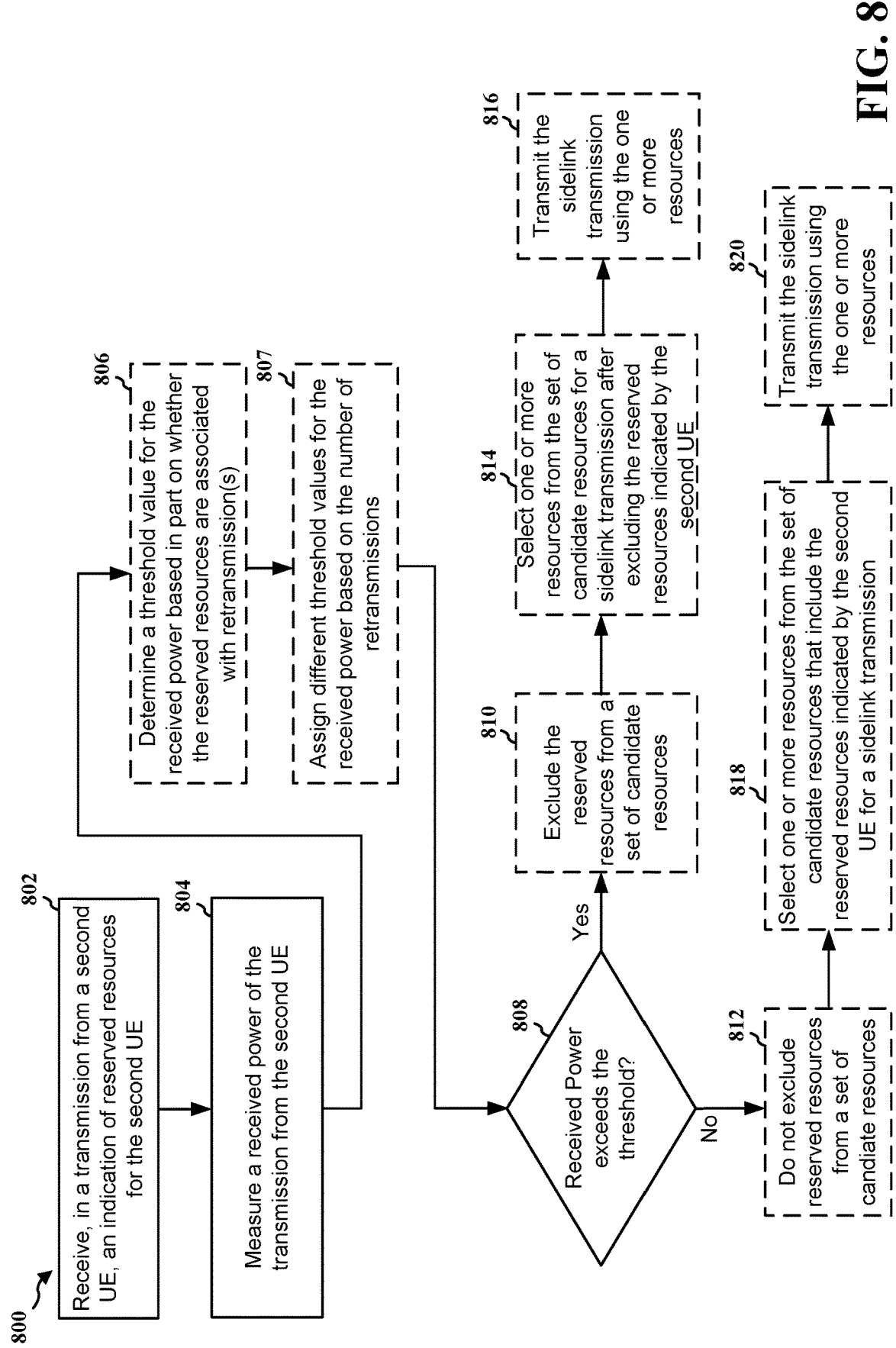
FIG. 8 is a flowchart of a method of wireless communication at a UE according to aspects of the present disclosure.

FIG. 8 is a flowchart 800 of a method of wireless communication. The method may be performed by a first UE or a component of a first UE (e.g., the UE 104, 602, 604, 606, 608, 702; the RSU 107, 607; the device 310 or 350; the apparatus 902; a processing system, which may include the memory 360 and which may be the device 350 or a component of the device 350, such as the TX processor 368, the RX processor 356, and/or the controller/processor 359). Optional aspects are illustrated with a dashed line. The method may reduce resource exclusion and waste for the first UE and/or other sidelink devices. The method may also improve the use of wireless resources in sidelink communication, such as V2X or other D2D communication.

At 802, the first UE may receive, in a transmission from a second UE, an indication of reserved resources for the second UE, such as described in connection with FIG. 7. For example, at 706, the first UE 702 may receive the indication 720 from the second UE 704 that indicates one or more sidelink resource reservations. The transmission may be included in an SCI message transmitted by the second UE. For example, the message may be based on sidelink and may be received via a PC5 interface. The message may be transmitted by the second UE via broadcast, multicast, groupcast, unicast, etc. The reception of the indication may be performed, e.g. by the reserved resource determination component 940 and/or the reception component 930 of the apparatus 902 in FIG. 9.

At 804, the first UE may measure a received power of the transmission from the second UE, such as described in connection with FIG. 7. For example, at 708, the first UE 702 may measure the received power of the indication 720 transmitted from the second UE 704. Thus, the received power may be based on the RSRP of the transmission from the second UE. The RSRP may be the linear average over the power contributions of the resource elements that carry demodulation reference signals. The power per resource element may be determined from the energy received during the symbol, e.g., excluding the cyclic prefix. The RSRP measurement may be performed, e.g. by the RSRP measurement component 942 of the apparatus 902 in FIG. 9.

At 806, the first UE may determine the threshold value for the received power based at least in part on whether the reserved resources are associated with retransmission(s), such as described in connection with 710 and table 722 of FIG. 7. For examples, a higher threshold value may be assigned to the reserved resources if they are associated with retransmission(s) than if they are used for initial transmission. The determination of the RSRP threshold may be performed, e.g. by the RSRP threshold component 944 of the apparatus 902 in FIG. 9.

At 807, the first UE may assign different threshold values for the received power based on the number of retransmissions for which the resources are reserved (e.g., for a first retransmission, a second retransmission, third retransmission, etc.), such as described in connection with 710 and table 728 of FIG. 7. For examples, the first UE may set an RSRP threshold for a second retransmission that is higher than its first retransmission. Similarly, the first UE may set another RSRP threshold for a third retransmission that is higher than the second retransmission and so forth. The first UE may be configured to use different RSRP thresholds for each number of retransmission or for each group of retransmission (e.g., first to fourth retransmissions, fifth to eighth retransmissions, all transmissions after ninth retransmissions etc.). The number of retransmissions from the second UE may be determined based on a redundancy version identifier in SCI of the sidelink transmission from the second UE. The determination of the RSRP thresholds may be performed, e.g. by the RSRP threshold component 944 of the apparatus 902 in FIG. 9.

At 808, the first UE determines whether to exclude the reserved resources indicated by the second UE based on whether the received power of the transmission from the second UE meets a threshold, such as described in connection with FIG. 7. For example, at 710, the first UE 702 may determine whether to exclude one or more reserve resources indicated by the second UE 704 based on the measured RSRP and based on whether the one or more reserved resources are associated with retransmissions. As such, the threshold may be determined based at least in part on whether the reserved resources are associated with a retransmission. The determination of whether to exclude the reserved resources indicated by the second UE may be performed, e.g. by the resource inclusion/exclusion component 946 of the apparatus 902 in FIG. 9.

For example, at 810, if the received power exceeds the threshold set by or defined for the first UE, the first UE may exclude the reserved resources from the resource selection (e.g., exclude from the first UE's candidate resources) such that these reserved resources may not be selected by the first UE. On the other hand, if the received power does not exceed the threshold set by or defined for the first UE, at 812, the first UE may determine not exclude the reserved resources from resource selection (e.g., include the reserved resources in the first UE's candidate resources). In other words, the first UE may determine to exclude the reserved resources indicated by the second UE if the received power of the transmission from the second UE meets a threshold, where the threshold may be based at least in part on whether the reserved resources are associated with a retransmission.

The exclusion, at 810, or non-exclusion, at 812, of the reserved resources may be performed as a part of maintaining a set of candidate resources that the first UE uses to select a resource for sidelink transmission. The selection may be performed, e.g., by the sidelink resource selection component 948 of the apparatus 902 in FIG. 9. For example, if the first UE determines to exclude the reserved resources, at 814, the first UE may select one or more resources from the set of candidate resources for a sidelink transmission. Then, at 816, the first UE may transmit a sidelink transmission using the one or more resources selected from the set of candidate resources. Similarly, if the first UE determines not to exclude the reserved resources, at 818, the first UE may select one or more resources from the set of candidate resources that include the reserved resources for a sidelink transmission. Then, at 820, the first UE may transmit a sidelink transmission using the one or more resources selected from the set of candidate resources. As such, the first UE may transmit the sidelink transmission using the reserved resources. The transmission may be performed, e.g., by the transmission component 934 of the apparatus 902 in FIG. 9.

Figure 9:
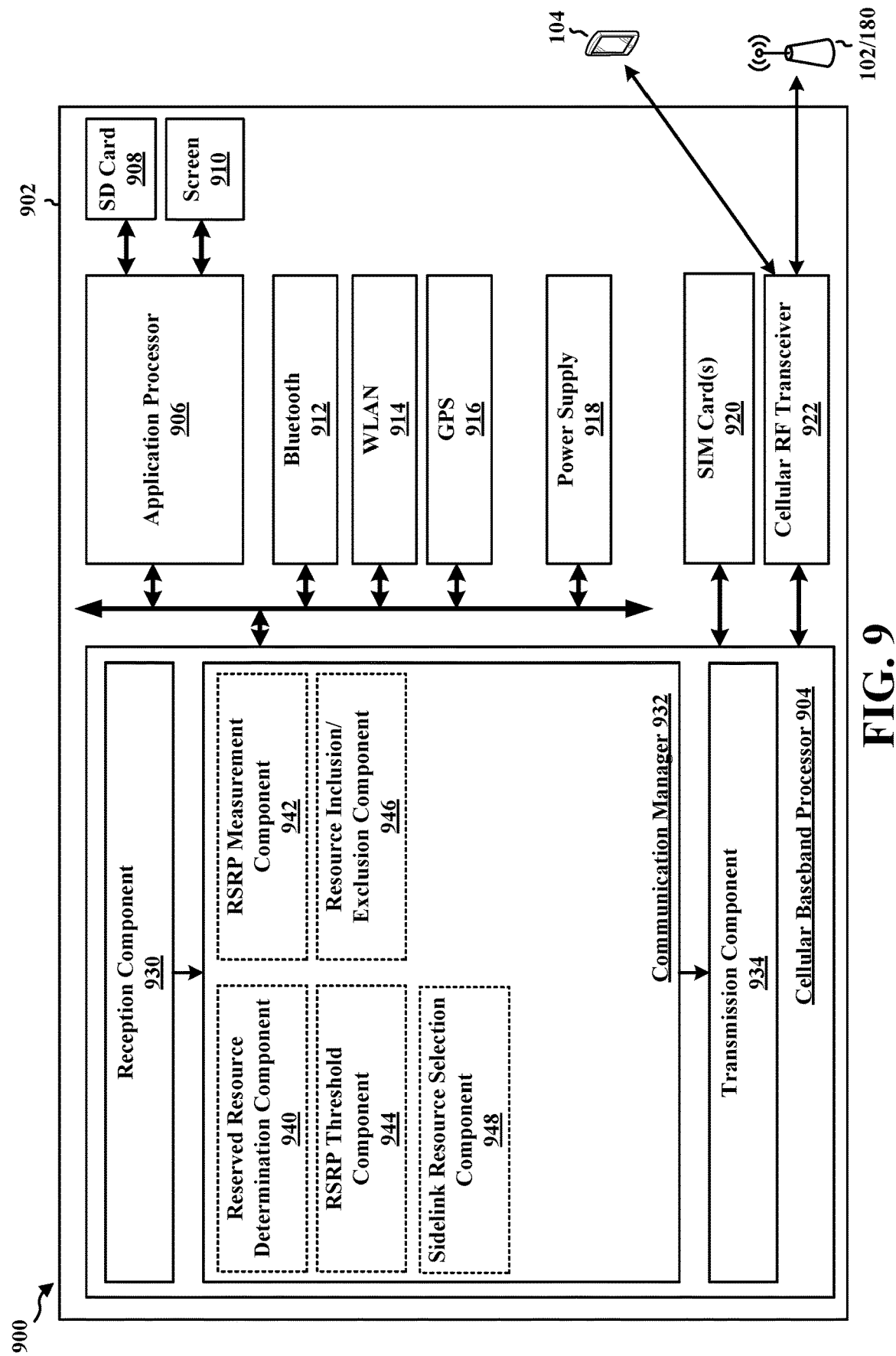
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable storage medium/memory. The computer-readable storage medium/memory may be non-transitory. The cellular baseband processor 904 is responsible for general processing, including the execution of software stored on the computer-readable storage medium/memory. The software, when executed by the cellular baseband processor 904, causes the cellular baseband processor 904 to perform the various functions described supra. The computer-readable storage medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable storage medium/memory and/or configured as hardware within the cellular baseband processor 904. The cellular baseband processor 904 may be a component of the device 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire wireless device (e.g., see 350 of FIG. 3) and include the additional modules of the apparatus 902.

The communication manager 932 includes a reserved resource determination component 940 that is configured to receive, in a transmission from a second UE, an indication of reserved resources for the second UE, e.g., as described in connection with 802 in FIG. 8. The communication manager 932 further includes an RSRP measurement component 942 configured to measure a received power of the transmission from the second UE, e.g., as described in connection with 804 in FIG. 8. The communication manager 932 further includes a RSRP threshold component 944 configured to determine a threshold value for the received power based in part on whether the reserved resources are associated with retransmission(s), e.g., as described in connection with 806 and/or 807 in FIG. 8. The communication manager 932 further includes a resource inclusion/exclusion component 946 configured to exclude the reserved resources indicated by the second UE if the received power of the transmission from the second UE meets a threshold, where the threshold may be based at least in part on whether the reserved resources are associated with a retransmission, e.g., as described in connection with 808 in FIG. 8.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable storage medium for implementation by a processor, or some combination thereof.

In one configuration, the apparatus 902, and in particular the cellular baseband processor 904, includes means for receiving, in a transmission from a second UE, an indication of reserved resources for the second UE. The apparatus 902 may further include means for measuring a received power of the transmission from the second UE. The apparatus 902 may further include means for determining to exclude the reserved resources indicated by the second UE if the received power of the transmission from the second UE meets a threshold, wherein the threshold is based at least in part on whether the reserved resources are associated with a retransmission.

The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples are illustrative only and aspects thereof may be combined with aspects of other embodiments or teaching described herein, without limitation.

Aspect 1 is a method of wireless communication at a first UE, comprising: receiving, in a transmission from a second UE, an indication of reserved resources for the second UE; measuring a received power of the transmission from the second UE; and excluding the reserved resources indicated by the second UE from a set of candidate resources based on the received power of the transmission from the second UE meeting a threshold, wherein the threshold is based at least in part on whether the reserved resources are associated with a retransmission.

In aspect 2, the method of aspect 1 further includes that the threshold is based on an RSRP.

In aspect 3, the method of aspect 1 or aspect 2 further includes that the first UE uses a first threshold to determine whether to exclude initial transmission resources and uses a second threshold to determine whether to exclude retransmission resources.

In aspect 4, the method of any of aspects 1-3 further includes that the second threshold is higher than the first threshold.

In aspect 5, the method of any of aspects 1-4 further includes that the first UE uses a first threshold to determine whether to exclude first retransmission resources and uses a second threshold to determine whether to exclude subsequent retransmission resources.

In aspect 6, the method of any of aspects 1-5 further includes that the second threshold is higher than the first threshold.

In aspect 7, the method of any of aspects 1-6 further includes that the threshold is based on a number of retransmissions.

In aspect 8, the method of any of aspects 1-7 further includes that the transmission comprises a sidelink transmission, the method further comprising: determining the number of retransmissions based on an RV ID in SCI of the sidelink transmission from the second UE.

In aspect 9, the method of any of aspects 1-8 further comprises: selecting one or more resources from the set of candidate resources for a sidelink transmission after excluding the reserved resources indicated by the second UE; and transmitting the sidelink transmission using the one or more resources.

Aspect 10 is an apparatus for wireless communication including at least one processor coupled to a memory and configured to implement a method as in any of aspects 1 to 9.

Aspect 11 is an apparatus for wireless communication including means for implementing a method as in any of aspects 1 to 9.

Aspect 12 is a non-transitory computer-readable storage medium storing computer executable code, where the code when executed by a processor causes the processor to implement a method as in any of aspects 1 to 9.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a first user equipment (UE), comprising:
   receiving, in a transmission from a second UE, an indication of reserved resources for the second UE;
   measuring a received power of the transmission from the second UE; and
   excluding the reserved resources indicated by the second UE from a set of candidate resources based on the received power of the transmission from the second UE meeting a threshold, wherein the threshold is based at least in part on whether the reserved resources are associated with an initial transmission or a retransmission, wherein a first threshold is used to determine whether to exclude initial transmission resources and a second threshold is used to determine whether to exclude retransmission resources, the second threshold being higher than the first threshold.

2. The method of claim 1, further comprising:
   selecting one or more resources from the set of candidate resources for a sidelink transmission after excluding the reserved resources indicated by the second UE; and
   transmitting the sidelink transmission using the one or more resources.

3. The method of claim 1, wherein the threshold is based on a reference signal received power (RSRP).

4. The method of claim 1, wherein the first UE uses the second threshold to determine whether to exclude first retransmission resources and uses a third threshold to determine whether to exclude subsequent retransmission resources.

5. The method of claim 4, wherein the third threshold is higher than the second threshold.

6. The method of claim 1, wherein the second threshold is based on a number of retransmissions.

7. The method of claim 6, wherein the transmission comprises a sidelink transmission, the method further comprising:

determining the number of retransmissions based on a redundancy version (RV) identifier (ID) in sidelink control information (SCI) of the sidelink transmission from the second UE.

8. An apparatus for wireless communication at a first user equipment (UE), comprising:
means for receiving, in a transmission from a second UE, an indication of reserved resources for the second UE;
means for measuring a received power of the transmission from the second UE; and
means for excluding the reserved resources indicated by the second UE from a set of candidate resources based on the received power of the transmission from the second UE meeting a threshold, wherein the threshold is based at least in part on whether the reserved resources are associated with an initial transmission or a retransmission, wherein a first threshold is used to determine whether to exclude initial transmission resources and a second threshold is used to determine whether to exclude retransmission resources, the second threshold being higher than the first threshold.

9. The apparatus of claim 8, further comprising:
means for selecting one or more resources from the set of candidate resources for a sidelink transmission after excluding the reserved resources indicated by the second UE; and
means for transmitting the sidelink transmission using the one or more resources.

10. The apparatus of claim 8, wherein the threshold is based on a reference signal received power (RSRP).

11. The apparatus of claim 8, wherein the first UE uses the second threshold to determine whether to exclude first retransmission resources and uses a third threshold to determine whether to exclude subsequent retransmission resources.

12. The apparatus of claim 11, wherein the third threshold is higher than the second threshold.

13. The apparatus of claim 8, wherein the second threshold is based on a number of retransmissions.

14. The apparatus of claim 13, wherein the transmission comprises a sidelink transmission, the apparatus further comprising:
means for determining the number of retransmissions based on a redundancy version (RV) identifier (ID) in sidelink control information (SCI) of the sidelink transmission from the second UE.

15. An apparatus for wireless communication at a first user equipment (UE), comprising:
a memory; and
at least one processor coupled to the memory and configured to:
receive, in a transmission from a second UE, an indication of reserved resources for the second UE;
measure a received power of the transmission from the second UE; and
exclude the reserved resources indicated by the second UE from a set of candidate resources based on the received power of the transmission from the second UE meeting a threshold, wherein the threshold is based at least in part on whether the reserved resources are associated with an initial transmission or a retransmission, wherein a first threshold is used to determine whether to exclude initial transmission resources and a second threshold is used to determine whether to exclude retransmission resources, the second threshold being higher than the first threshold.

16. The apparatus of claim 15, wherein the at least one processor coupled to the memory is further configured to:
select one or more resources from the set of candidate resources for a sidelink transmission after excluding the reserved resources indicated by the second UE; and
transmit the sidelink transmission using the one or more resources.

17. The apparatus of claim 15, wherein the threshold is based on a reference signal received power (RSRP).

18. The apparatus of claim 15, wherein the first UE uses the second threshold to determine whether to exclude first retransmission resources and uses a third threshold to determine whether to exclude subsequent retransmission resources.

19. The apparatus of claim 18, wherein the third threshold is higher than the second threshold.

20. The apparatus of claim 15, wherein the second threshold is based on a number of retransmissions.

21. The apparatus of claim 20, wherein the transmission comprises a sidelink transmission, the at least one processor coupled to the memory is further configured to:
determine the number of retransmissions based on a redundancy version (RV) identifier (ID) in sidelink control information (SCI) of the sidelink transmission from the second UE.

22. A non-transitory computer-readable medium storing computer executable code, the code when executed by a processor causes the processor to:
receive, in a transmission from a second UE, an indication of reserved resources for the second UE;
measure a received power of the transmission from the second UE; and
exclude the reserved resources indicated by the second UE from a set of candidate resources based on the received power of the transmission from the second UE meeting a threshold, wherein the threshold is based at least in part on whether the reserved resources are associated with an initial transmission or a retransmission, wherein a first threshold is used to determine whether to exclude initial transmission resources and a second threshold is used to determine whether to exclude retransmission resources, the second threshold being higher than the first threshold.

23. The non-transitory computer-readable medium of claim 22, wherein the code when executed by the processor further causes the processor to:
select one or more resources from the set of candidate resources for a sidelink transmission after excluding the reserved resources indicated by the second UE; and
transmit the sidelink transmission using the one or more resources.

24. The non-transitory computer-readable medium of claim 22, wherein the threshold is based on a reference signal received power (RSRP).

25. The non-transitory computer-readable medium of claim 22, wherein the code when executed by the processor further causes the processor to:
use the second threshold to determine whether to exclude first retransmission resources and use a third threshold to determine whether to exclude subsequent retransmission resources.

26. The non-transitory computer-readable medium of claim 25, wherein the third threshold is higher than the second threshold.

27. The non-transitory computer-readable medium of claim 22, wherein the second threshold is based on a number of retransmissions.

28. The non-transitory computer-readable medium of claim 27, wherein the transmission comprises a sidelink transmission, the code when executed by the processor further causes the processor to:
    determine the number of retransmissions based on a redundancy version (RV) identifier (ID) in sidelink control information (SCI) of the sidelink transmission from the second UE.

\* \* \* \* \*